US008666227B2

(12) United States Patent
Nakamura

(10) Patent No.: US 8,666,227 B2
(45) Date of Patent: Mar. 4, 2014

(54) INFORMATION PROCESSING APPARATUS, EFFECT PROGRAM, AND CONTENT CORRECTION PROCESSING METHOD

(75) Inventor: Seiichi Nakamura, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 419 days.

(21) Appl. No.: 12/551,278

(22) Filed: Aug. 31, 2009

(65) Prior Publication Data
US 2010/0111490 A1 May 6, 2010

(30) Foreign Application Priority Data

Oct. 30, 2008 (JP) ................................ 2008-280285

(51) Int. Cl.
H04N 5/76 (2006.01)
(52) U.S. Cl.
USPC ......................................... 386/285
(58) Field of Classification Search
USPC ......................................... 386/285
See application file for complete search history.

(56) References Cited

U.S. PATENT DOCUMENTS

| 6,023,016 | A | 2/2000 | Tamura | |
|---|---|---|---|---|
| 7,461,175 | B2 | 12/2008 | Ono et al. | |
| 7,817,156 | B2 | 10/2010 | Ichieda | |
| 2005/0257228 | A1* | 11/2005 | Ono et al. | 719/331 |
| 2005/0278455 | A1 | 12/2005 | Ichieda | |
| 2006/0170819 | A1* | 8/2006 | Lim et al. | 348/385.1 |
| 2008/0004886 | A1* | 1/2008 | Hames et al. | 705/1 |
| 2009/0304082 | A1* | 12/2009 | Radhakrishnan et al. | 375/240.15 |
| 2010/0042682 | A1* | 2/2010 | Kaye | 709/203 |
| 2011/0043531 | A1 | 2/2011 | Ichieda | |

FOREIGN PATENT DOCUMENTS

| JP | H09-258737 | 10/1997 |
|---|---|---|
| JP | 09-305372 | 11/1997 |
| JP | H09-305372 | 11/1997 |
| JP | 2003-111110 | 4/2003 |
| JP | 2004-015499 | 1/2004 |
| JP | 2005-317115 | 11/2005 |
| JP | 2005-352795 | 12/2005 |
| JP | 2006-040021 | 2/2006 |
| JP | 2006-101364 | 4/2006 |
| JP | 2007-067459 | 3/2007 |
| JP | 2007-180905 | 7/2007 |
| JP | 2008-131570 | 6/2008 |

OTHER PUBLICATIONS

Explanation of Non-English Language References.

(Continued)

Primary Examiner — Thai Tran
Assistant Examiner — William Tran
(74) Attorney, Agent, or Firm — Knobbe, Martens, Olson & Bear LLP

(57) ABSTRACT

According to one embodiment, an information processing apparatus includes a capture module which acquires video data and audio data output from a first module to a second module, a time stamp module which respectively adds time information to the video data and audio data acquired by the capture module, an effect module which performs correction processing of at least one of the video data and audio data acquired by the capture module, and a synchronization output module which synchronizes and outputs the video data and audio data at least one of which has undergone the correction processing by the effect module to the second module based on the time information added by the time stamp module.

7 Claims, 5 Drawing Sheets

(56) References Cited

OTHER PUBLICATIONS

Notice of Reasons for Rejection mailed by the Japan Patent Office on Jan. 5, 2010 in corresponding Japanese patent app. No. 2008-280285 in 7 pages.

Decision of Rejection mailed by the Japan Patent Office on Mar. 16, 2010 in corresponding Japanese patent app. No. 2008-280285 in 5 pages.

Official Letter of Inquiry mailed by the Japan Patent Office on Oct. 7, 2011 in corresponding Japanese patent app. No. 2010-013187 in 7 pages.

\* cited by examiner

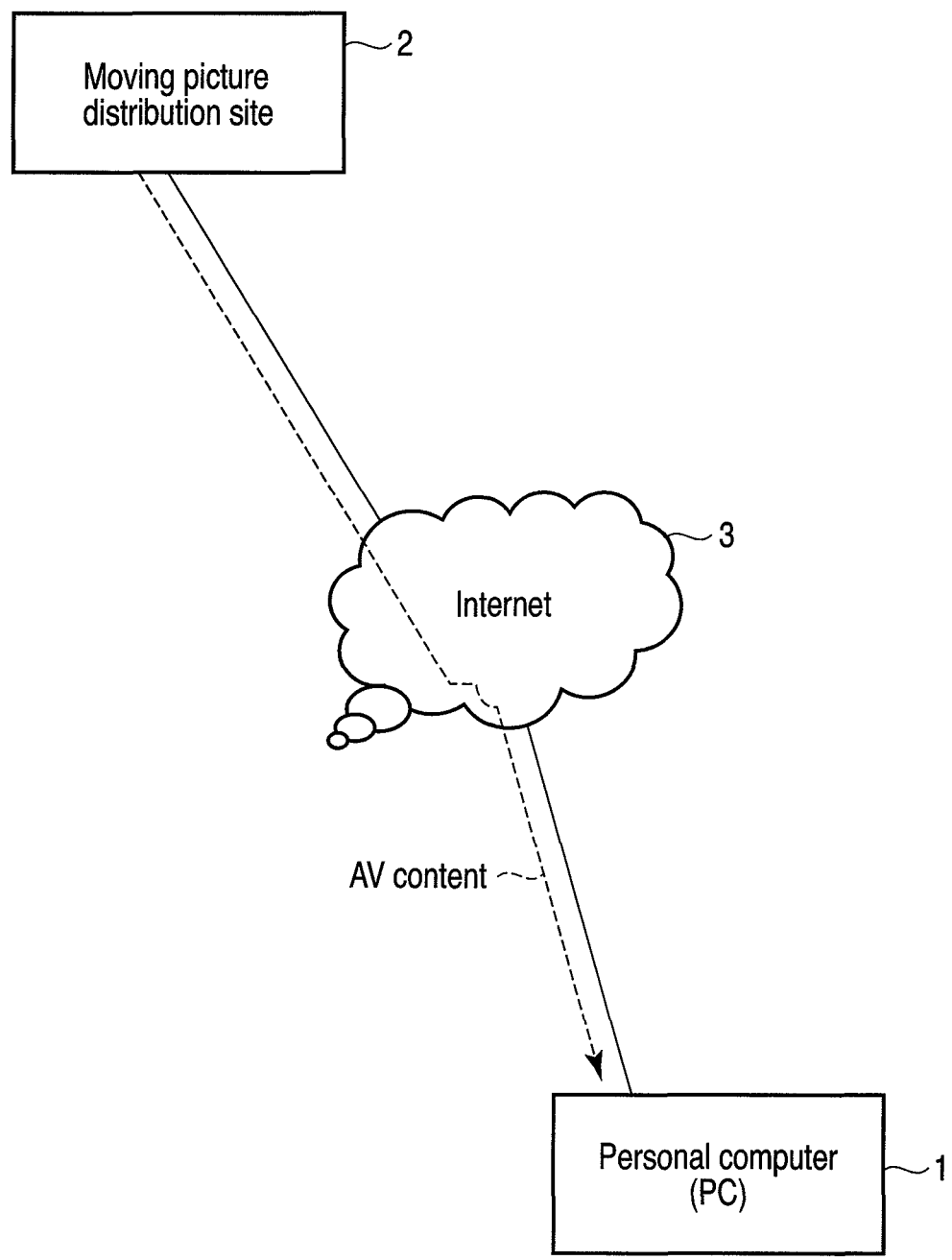
F I G. 1

INFORMATION PROCESSING APPARATUS, EFFECT PROGRAM, AND CONTENT CORRECTION PROCESSING METHOD

CROSS-REFERENCE TO RELATED APPLICATIONS

This application is based upon and claims the benefit of priority from Japanese Patent Application No. 2008-280285, filed Oct. 30, 2008, the entire contents of which are incorporated herein by reference.

BACKGROUND

1. Field

One embodiment of the invention relates to a moving picture content correction technique suitable for, e.g., a personal computer including a browser function to download moving picture content from a moving picture distribution site via the Internet, and plays it back.

2. Description of the Related Art

In recent years, it is popular to browse moving picture content (AV content) available from a moving picture distribution site on the Internet using a browser.

When the user browses a web page of a moving picture distribution site using a browser, the browser activates a moving picture reception/playback program embedded as plug-in software. When the user performs an operation for instructing to start playing back AV content, the moving picture reception/playback program downloads the AV content from the moving picture distribution site via the Internet, and decodes the content to separate it into video data and audio data. The moving picture reception/playback program outputs the separated video data and audio data to a dynamic link library (DLL) which belongs to an operating system. The video data and audio data are passed to the kernel module of the operating system via the DLL, and output from, e.g., a display and loudspeaker, respectively.

Furthermore, in recent years, there has been an increasing demand to enjoy a higher-quality picture of the AV content played back by the above-described procedure. There has also been a strong demand to meet the above demand while utilizing existing modules intact.

To meet the above demands, there exists a method in which data exchanged between two modules are acquired by another module, and the other module executes target processing (in this case, image correction for high quality) of the acquired data (see, e.g., Jpn. Pat. Appln KOKAI Publication No. 2006-40021).

To play back AV content downloaded from a moving picture distribution site, video data and audio data contained in the AV content must be respectively output to a display and loudspeaker in synchronism with each other. It is therefore impossible to adopt an easy method which acquires only the video data contained in the AV content, and corrects the video data to improve picture quality.

Even if both the video data and audio data are acquired, and corrected to improve picture quality and sound quality, respectively, there is a difference between delay times due to the correction of the video data and audio data. This makes it difficult to realize AV content playback which satisfies the user's needs.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary view showing a use mode of an information processing apparatus (personal computer) according to an embodiment of the invention;

DETAILED DESCRIPTION

Various embodiments according to the invention will be described hereinafter with reference to the accompanying drawings. In general, according to one embodiment of the invention, an information processing apparatus includes a capture module which acquires video data and audio data output from a first module to a second module, a time stamp module which respectively adds time information to the video data and audio data acquired by the capture module, an effect module which performs correction processing of at least one of the video data and audio data acquired by the capture module, and a synchronization output module which synchronizes and outputs the video data and audio data at least one of which has undergone the correction processing by the effect module to the second module based on the time information added by the time stamp module.

FIG. 1 is an exemplary view showing a use mode of an information processing apparatus 1 according to an embodiment of the invention. This information processing apparatus 1 is implemented as, e.g., a notebook personal computer (PC). Assume that the user uses the computer 1 to download, via the Internet 3, AV content provided by a moving picture distribution site 2, and enjoy the content.

Figure 2:
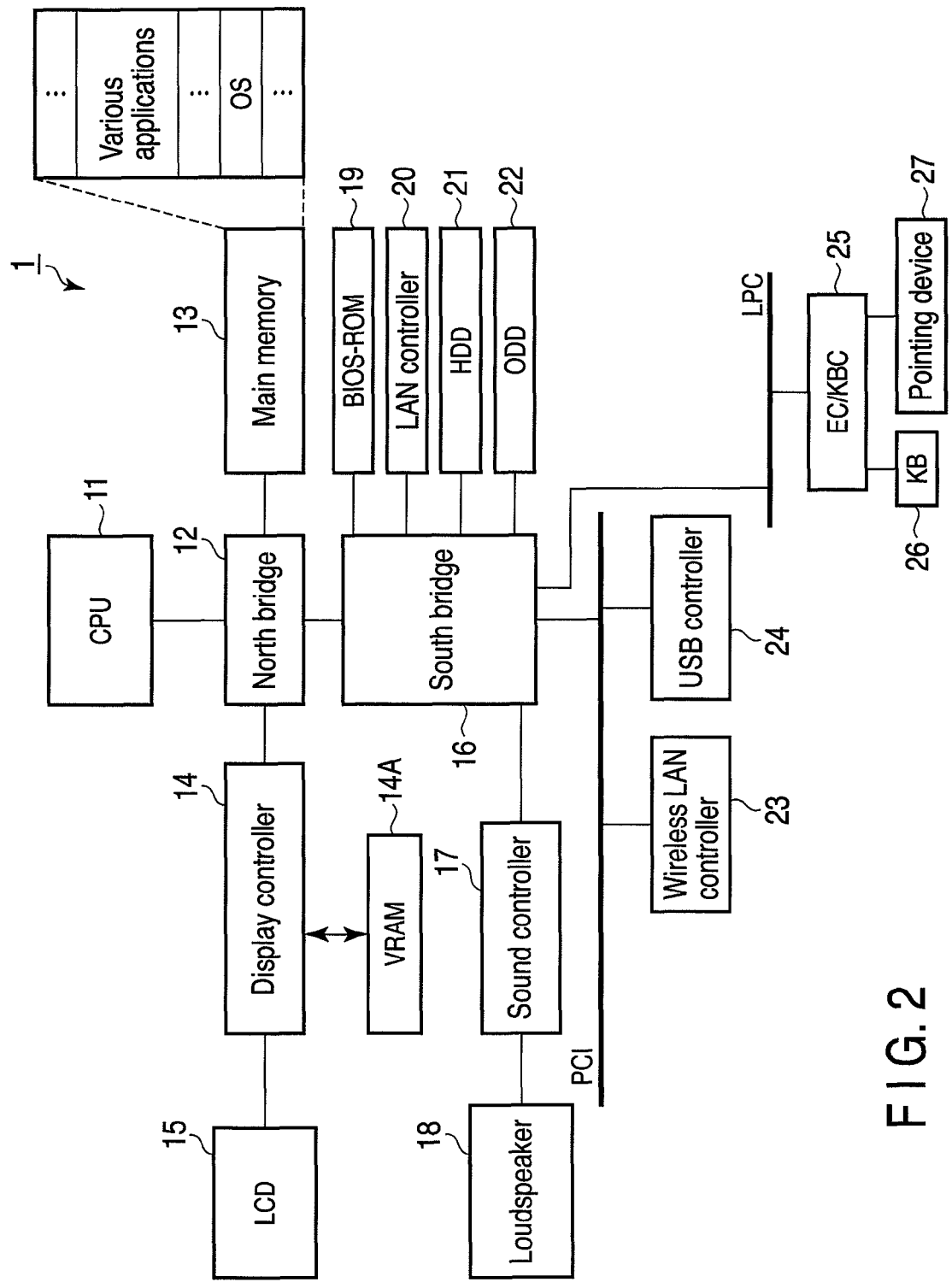
FIG. 2 is an exemplary block diagram showing the system configuration of the computer of the embodiment.

FIG. 2 is an exemplary block diagram showing the system configuration of the computer 1.

As shown in FIG. 2, the computer 1 includes a CPU 11, north bridge 12, main memory 13, display controller 14, video memory (VRAM) 14A, liquid crystal display (LCD) 15, south bridge 16, sound controller 17, loudspeaker 18, BIOS-ROM 19, LAN controller 20, hard disk drive (HDD) 21, optical disc drive (ODD) 22, wireless LAN controller 23, USB controller 24, embedded controller/keyboard controller (EC/KBC) 25, keyboard (KB) 26, and pointing device 27.

The CPU 11 is a processor for controlling the operation of the computer 1, and executes an operating system (OS) and various application programs running under the control of the OS, which are loaded from the HDD 21 and the ODD 22 into the main memory 13. The CPU 11 also executes a basic input/output system (BIOS) stored in the BIOS-ROM 19. The BIOS is a program for hardware control.

The north bridge 12 is a bridge device for connecting the local bus of the CPU 11 to the south bridge 16. The north bridge 12 incorporates a memory controller to make access control of the main memory 13. The north bridge 12 also includes a function of executing communication with the display controller 14.

The display controller 14 is a device for controlling the LCD 15 used as a display monitor of the computer 1. The display controller 14 generates a display signal to be sent to the LCD 15.

The south bridge 16 controls devices on a Peripheral Component Interconnect (PCI) bus and devices on a Low Pin Count (LPC) bus. The south bridge 16 incorporates an Integrated Drive Electronics (IDE) controller to control the HDD 21 and ODD 22, and a memory controller to make access control of the BIOS-ROM 19. The south bridge 16 also includes a function of communicating with the sound controller 17 and LAN controller 20.

The sound controller 17 is a sound generator, and outputs audio data to be played back to the loudspeaker 18.

The LAN controller 20 is a wired communication device which performs wired communication complying with, e.g., the Ethernet® standard. The wireless LAN controller 23 is a wireless communication device which performs wireless communication complying with, e.g., the IEEE 802.11 standard. The USB controller 24 communicates with an external device via a cable complying with, e.g., the USB 2.0 standard.

The EC/KBC 25 is a one-chip microcomputer on which an embedded controller for power management and a keyboard controller for controlling the keyboard (KB) 26 and pointing device 27 are integrated. The EC/KBC 25 includes a function of powering the computer 1 on/off in response to a user operation.

The programs (OS and various applications) which are loaded from the HDD 21 into the main memory 13 and are executed by the CPU 11 cause the computer 1 with the above-described arrangement to download, via the Internet 3, AV content provided by the moving picture distribution site 2 shown in FIG. 1, and play back the content.

More specifically, the AV content is input by communication processing executed by the LAN controller 20, wireless LAN controller 23, or USB controller 24. The CPU 11 decodes the AV content to separate it into video data and audio data. The CPU 11 supplies the video data to the display controller 14 to output a picture on the LCD 15, and supplies the audio data to the sound controller 17 to output sound from the loudspeaker 18.

The schematic structure of the above-mentioned programs for causing the computer 1 to download, via the Internet 3, the AV content provided by the moving picture distribution site 2 shown in FIG. 1, and play back the content will be described next with reference to FIG. 3.

Figure 3:
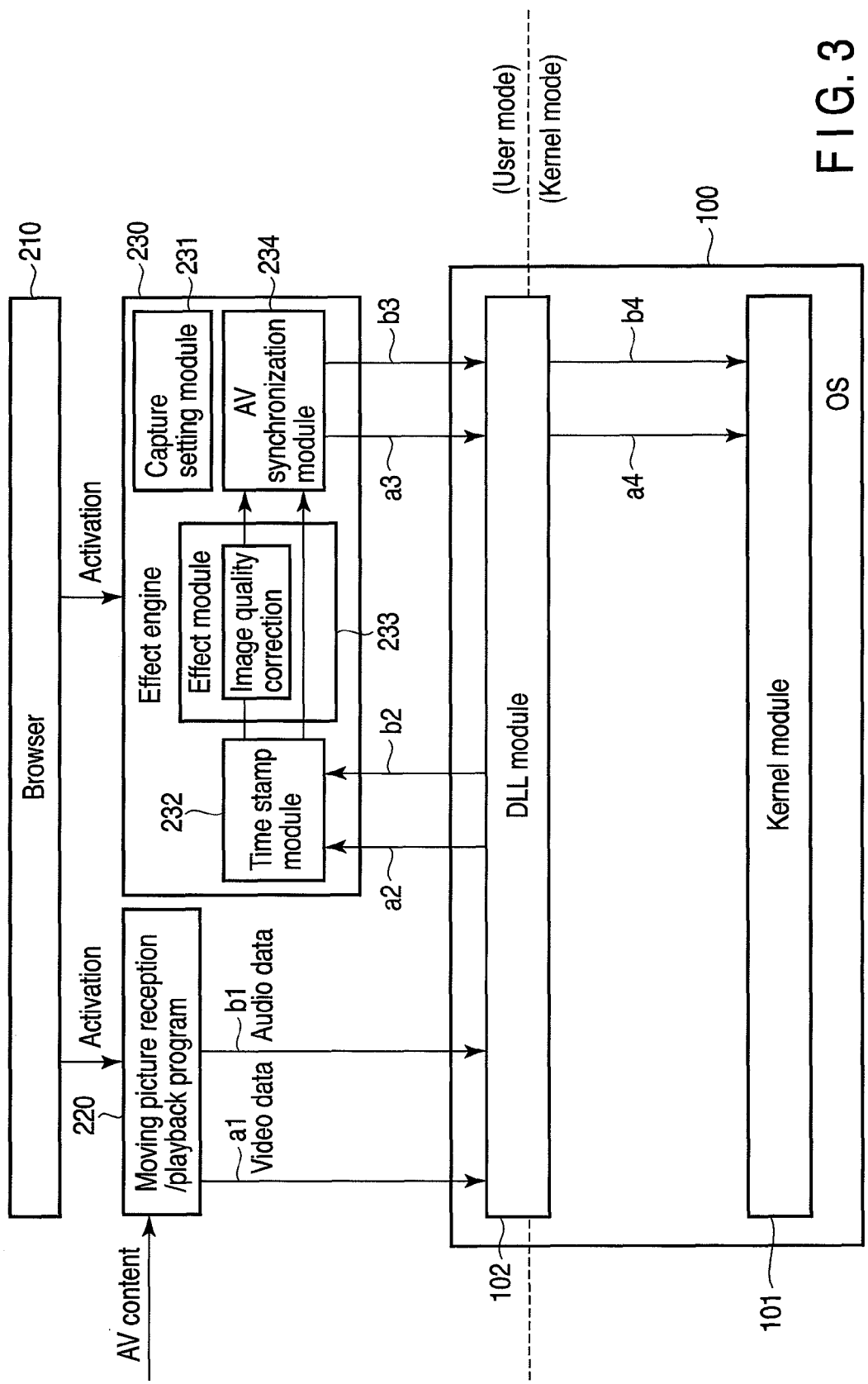
FIG. 3 is an exemplary block diagram showing the schematic structure of programs for causing the computer of the embodiment to download, via the Internet, AV content provided by a moving picture distribution site, and play back the content.

As shown in FIG. 3, an OS 100, browser 210, moving picture reception/playback program 220, and effect engine 230 are installed on the computer 1. The moving picture reception/playback program 220 and effect engine 230 are embedded in the browser 210 as plug-in software.

The OS 100 which controls resource management of the entire computer 1 includes a kernel module 101 and DLL module 102. The kernel module 101 is a module for performing driving control of each part (hardware) of the computer 1 shown in FIG. 2. The DLL module 102 is a module for providing an interface with the kernel module 101. Program layers until the various application programs issue, to the DLL module 102, various requests to the kernel module 101 are referred to as a user mode. Program layers after that point, i.e., a section from when the DLL module 102 transmits the requests to the kernel module 101 are referred to as a kernel mode.

When the user browses a web page of the moving picture distribution site 2 using the browser 210, the browser 210 detects using tag information in this web page that the site has distributable AV content, and activates the moving picture reception/playback program 220 embedded as plug-in software. When the user performs an operation for instructing to start playing back the AV content while browsing the web page, the moving picture reception/playback program 220 starts downloading the AV content from the moving picture distribution site 2 via the Internet 3.

The moving picture reception/playback program 220 decodes the AV content as it downloads the AV content. With this decoding processing, the moving picture reception/playback program 220 separates and extracts the video data and audio data contained in the AV content. The moving picture reception/playback program 220 passes the extracted video data and audio data to the DLL module 102 of the OS 100 to output a picture (on the LCD 15) and sound (from the loudspeaker 18) (video data "a1" and audio data "b1").

In general, the video data "a1" and audio data "b1" which have been passed to the DLL module 102 undergo processing such as a format check in the DLL module 102, and are then supplied to the kernel module 101. The kernel module 101 outputs a picture on the LCD 15, and sound from the loudspeaker 18.

In contrast, to meet the user's demand to enjoy, with high quality, the AV content downloaded from the moving picture distribution site 2, the computer 1 incorporates the effect engine 230, which corrects the video data "a1" to improve picture quality. This will be explained in detail below.

The effect engine 230 is a program embedded as resident plug-in software which is started upon activation of the browser 210. As shown in FIG. 3, the effect engine 230 includes a capture setting module 231, time stamp module 232, effect module 233, and AV synchronization module 234.

The capture setting module 231 is a module for rewriting a routine within the DLL module 102 so as to acquire the video data "a1" and audio data "b1" output from the moving picture reception/playback program 220 to the DLL module 102. An example of the processing of rewriting the routine within the DLL module 102 will be described later. In brief, the processing rewrites the routine so as to pass the video data "a1" and audio data "b1" received from the moving picture reception/playback program 220 to the time stamp module 232 of the effect engine 230 (video data "a2" and audio data "b2"). Upon activation of the effect engine 230, the capture setting module 231 requests the browser 210 to send a notification of activation of the moving picture reception/playback program 220. Upon reception of the notification, the capture setting module 231 rewrites the routine within the DLL module 102.

The time stamp module 232 which receives the video data "a2" and audio data "b2" from the DLL module 102 by the operation of the capture setting module 231 is a module for adding time information indicating the reception timing to each data. The time information may be the system time of the computer 1 or timing data for which count-up starts upon activation of the effect engine 230 as far as the information makes it possible to determine time.

The video data "a2" and audio data "b2" added with the time information by the time stamp module 232 are directed to the effect module 233. The effect module 233 is a module for correcting the video data "a2" to improve picture quality. Note that although a case in which the effect module 233 corrects only the video data "a2" is given, correcting the audio data "b2" to improve sound quality is not ruled out. As a matter of course, it is possible to correct the video data "a2" and audio data "b2" to improve picture quality and sound quality, respectively. It is also possible to correct only the audio data "b2" (to improve sound quality).

The effect module 233 directs, to the AV synchronization module 234, the video data "a2" and audio data "b2" at least one of which (in this case, only the video data "a2") has been corrected. The AV synchronization module 234 is a module for synchronizing the video data "a2" and audio data "b2" received from the effect module 233 so as to absorb the difference between the delay times due to the correction, and outputting them to the DLL module 102, on the basis of the time information added by the time stamp module 232 (video data "a3" and audio data "b3"). The output processing of the video data "a3" and audio data "b3" based on the time information will be described later.

The kernel module 101 receives, via the DLL module 102, the video data "a3" and audio data "b3" output from the AV synchronization module 234 to the DLL module 102 (video data "a4" and audio data "b4") to output a high-quality picture and high-quality sound.

As described above, the user can enjoy, with high picture quality and sound quality, the AV content downloaded from the moving picture distribution site 2 while utilizing the existing moving picture reception/playback program 220 intact.

Figure 4:
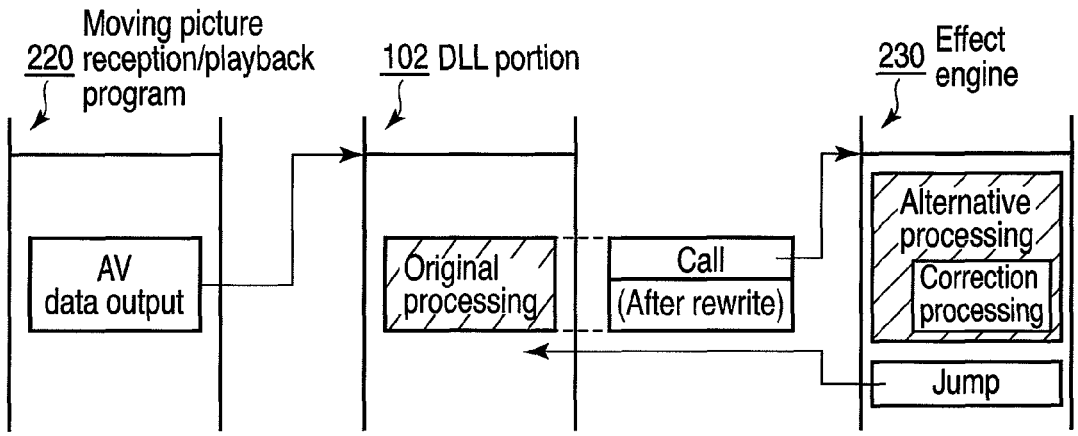
FIG. 4 is an exemplary conceptual view for explaining processing of rewriting a routine within a DLL module of an OS by a capture setting module of an effect engine which is embedded in a browser as plug-in software, and runs on the computer of the embodiment.

FIG. 4 is an exemplary conceptual view for explaining processing of rewriting the routine within the DLL module 102 by the capture setting module 231.

As described above, the moving picture reception/playback program 220 passes the video data and audio data (AV data) separated and extracted from the AV content to the DLL module 102 of the OS 100. The capture setting module 231 of the effect engine 230 which has been notified of activation of the moving picture reception/playback program 220 by the browser 210 rewrites the routine ("original processing" part shown in FIG. 4) within the DLL module 102 which executes processing such as a form check on the input AV data to a routine which contains, in its start part, a call procedure ("call" shown in FIG. 4) for transmitting the AV data simultaneously with transfer of control to the effect engine 230. The AV data is transmitted by communicating address information in the main memory 13 which stores the AV data to be corrected. The capture setting module 231 performs the rewrite processing.

In the effect engine 230, a procedure ("jump" shown in FIG. 4) for forcedly returning control immediately after the routine within the DLL module 102 is added after a procedure for performing alternative processing in which the original processing that should have been executed on the AV data in the routine within the DLL module 102 is supplemented with correction processing for high picture quality and sound quality. With this procedure, the AV data after the alternative processing is returned to the DLL module 102. The AV data after the correction is output so as to be overwritten in the main memory 13 which stores the AV data before the correction (so as to match at least the storage start positions).

Figure 5:
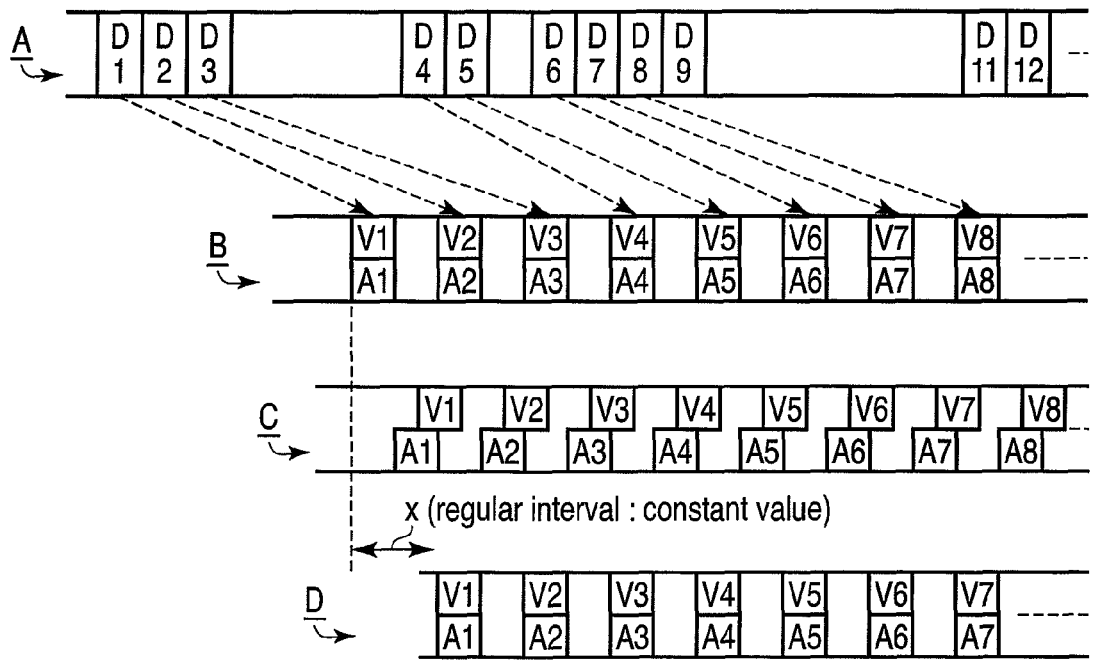
FIG. 5 is an exemplary conceptual view for explaining a principle of outputting AV data after correction by an AV synchronization module of the effect engine running on the computer of the embodiment.

FIG. 5 is an exemplary conceptual view for explaining a principle in which the AV synchronization module 234 outputs, based on the time information added by the time stamp module 232, the video data and audio data that have been corrected by the effect module 233.

Referring to FIG. 5, reference symbol "A" denotes a timing chart showing a case in which the moving picture reception/playback program 220 downloads AV content; "B", a timing chart showing a case in which the moving picture reception/playback program 220 outputs video data and audio data separated/acquired by decoding the downloaded AV content; "C", a timing chart showing a case in which the effect module 233 of the effect engine 230 outputs the video data and audio data after correction; and "D", a timing chart showing a case in which the AV synchronization module 234 of the effect engine 230 outputs the video data and audio data received from the effect module 233 to the DLL module 102.

Since changes in communication environment may have influence on data communication performed between the computer 1 and moving picture distribution site 2 via the Internet 3, the LAN controller 20 may download AV content items D1, D2, . . . at irregular intervals, as denoted by reference symbol "A" in FIG. 5. To cope with this, the moving picture reception/playback program 220 which decodes the AV content includes a function of synchronously outputting separated/extracted video data V1, V2, . . . and audio data A1, A2, . . . to the DLL module 102 of the OS 100, as denoted by reference symbol "B" in FIG. 5. The time stamp module 232 of the effect engine 230, therefore, adds identical time information to the video data and audio data, which are synchronous with each other, almost at timings shown in the timing chart "B" in FIG. 5.

However, if the effect module 233 of the effect engine 230 corrects the video data and audio data to improve picture quality and sound quality, respectively, there exists a time difference between the video data and audio data (due to the presence/absence of correction and the difference in content), as denoted by reference symbol "C" in FIG. 5. The AV synchronization module 234 of the effect engine 230 outputs the video data and audio data when, for example, a time interval "x" during which a parameter is input has elapsed from a time point specified by the time information added by the time stamp module 232, thereby synchronizing the video data and audio data again, as denoted by reference symbol "D" in FIG. 5.

The time interval "x" is sufficiently short compared with a time interval required to start transferring the AV content from the moving picture distribution site 2 to the moving picture reception/playback program 220 after the user performs an operation for instructing to start playing back the AV content. The user, therefore, does not experience an unnatural impression.

Since the AV synchronization module 234 has a mechanism of absorbing any delay time difference due to the correction, it is possible to apply various correction methods to the effect module 233. If, for example, an advanced correction method is applied, the time interval "x" has a large value. Furthermore, it is possible to individually determine the presence/absence of correction and a correction method without considering the relationship between the video data and audio data.

Figure 6:
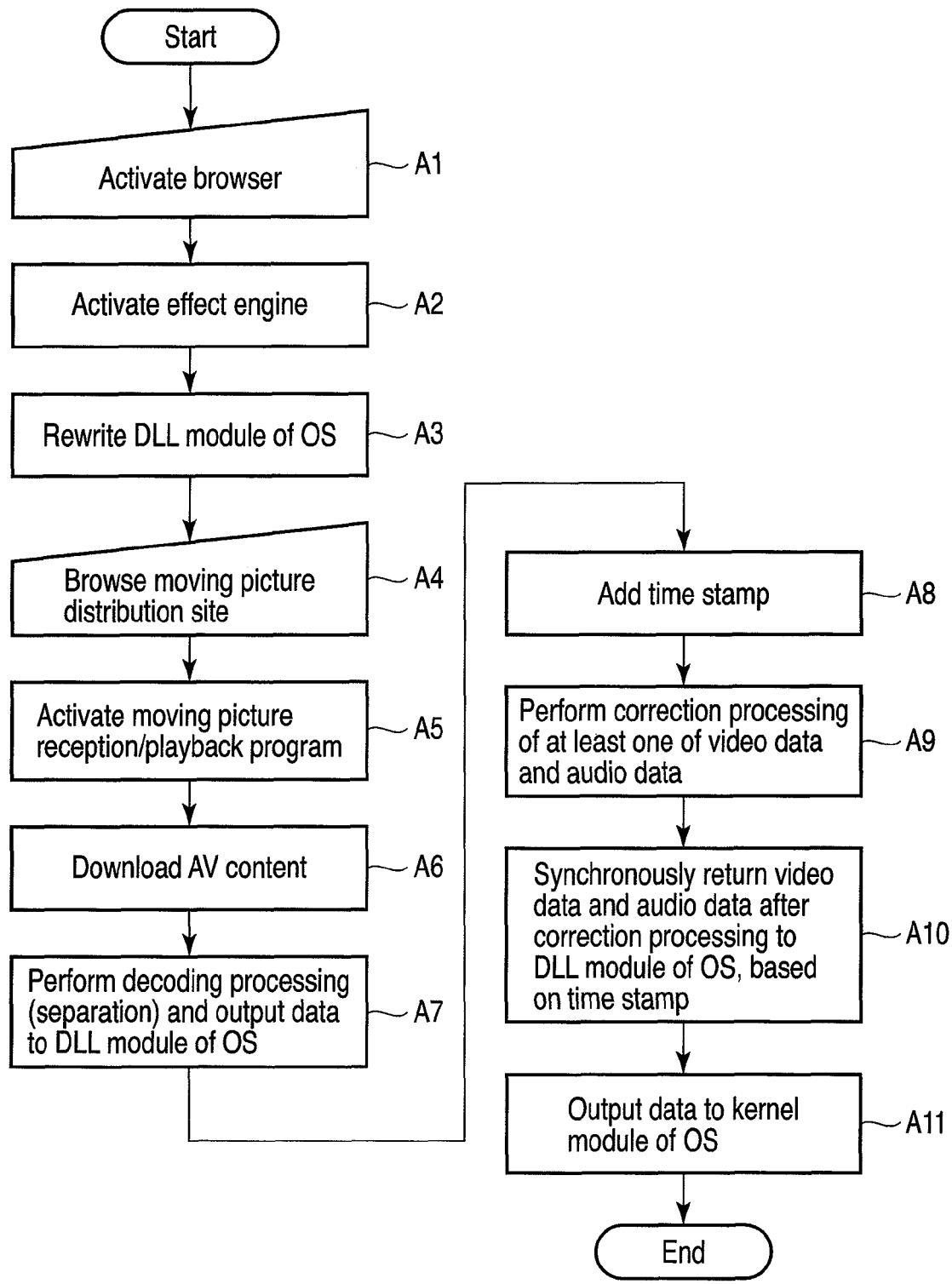
FIG. 6 is an exemplary flowchart showing an operation procedure for downloading AV content from a moving picture distribution site via the Internet, and playing back the content by the computer of the embodiment.

FIG. 6 is an exemplary flowchart showing an operation procedure for downloading AV content from the moving picture distribution site 2 via the Internet 3, and playing back the content by the computer 1.

If the user activates the browser 210 (block A1), the browser 210 activates the effect engine 230 embedded as plug-in software (block A2). The capture setting module 231 of the effect engine 230 rewrites the DLL module 102 of the OS 100 so as to acquire video data and audio data (block A3).

If the user browses a web page of the moving picture distribution site 2 using the browser 210 (block A4), the browser 210 activates the moving picture reception/playback program 220 embedded as plug-in software (block A5). When the user performs an operation for instructing to start playing back AV content, the moving picture reception/playback program 220 starts downloading the target AV content (block A6).

The moving picture reception/playback program 220 decodes the downloaded AV content to separate and extract video data and audio data, and outputs them to the DLL module 102 of the OS 100 (block A7). Since the DLL module 102 has been rewritten in block A3, the video data and audio data are passed to the effect engine 230.

The time stamp module 232 adds time information to the video data and audio data passed to the effect engine 230 (block A8). The effect module 233 executes correction processing of at least one of the video data and audio data (block A9). The AV synchronization module 234 synchronizes the video data and audio data passed through the effect module 233, and outputs them to the DLL module 102 of the OS 100, on the basis of the time information added by the time stamp module 232 (block A10).

The DLL module 102 supplies the video data and audio data to the kernel module 101 (block A11). With this operation, the AV content is corrected to improve picture quality and sound quality, and is then output as a picture and sound.

As described above, according to the computer 1, it is possible to appropriately correct at least one of the video data and audio data contained in the AV content downloaded from the moving picture distribution site 2 via the Internet 3, while utilizing the existing moving picture reception/playback program 220 intact.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a capture module configured to receive video data and audio data output from a first module comprising a function of decoding the video data and audio data;
a time stamp module configured to add time information to the video data and audio data received by the capture module, the addition of the time information to the video data and audio data by the time stamp module being performed after the decoding of the video data and the audio data by the first module;
an effect module configured to adjust at least one of the video data and audio data to which the time information is added by the time stamp module, the adjustment by the effect module comprising at least one of improving picture quality of the video data and improving sound quality of the audio data; and
a synchronization output module configured to output the video data to a second module when a first period of time has elapsed from a time indicated by the time information which is added to the video data, and to output the audio data to the second module when the first period of time has elapsed from a time indicated by the time information which is added to the audio data, at least one of the video data and the audio data being adjusted by the effect module;
wherein the first module is a moving picture reception and playback program embedded in a browser as plug-in software comprising a function of downloading content comprising video data and audio data via a network; and
wherein the second module is a dynamic link library (DLL) comprising an interface configured to exchange the video data and audio data with an operating system.

2. The information processing apparatus of claim 1, wherein the capture module is configured to receive the video data and audio data output from the moving picture reception and playback program by rewriting a routine within the DLL in order to insert a procedure configured to output the video data and audio data received from the moving picture reception and playback program before the adjustment.

3. The information processing apparatus of claim 2, wherein the capture module is configured to rewrite the routine within the DLL when a notification of activating the moving picture reception playback program is received from the browser.

4. The information processing apparatus of claim 1, wherein:
the capture module, the time stamp module, the effect module and the synchronization output module are formed as a routine of a third module; and
the third module is embedded in the browser as plug-in software.

5. The information processing apparatus of claim 1, wherein the effect module is configured to adjust image quality on the video data.

6. A computer-readable, non-transitory storage medium having stored thereon a computer program which is executable by a computer, on which a browser, a moving picture reception/playback program embedded in the browser as plug-in software comprising a function of downloading content containing video data and audio data via a network, and a DLL comprising an interface configured to exchange video data and audio data with an operating system are installed, the computer program controlling the computer to execute functions of:
receiving video data and audio data output from the moving picture reception and playback program;
adding time information to the received video data and audio data, the addition of the time information to the video data and audio data being performed after the decoding of the video data and audio data by the moving picture reception and playback program;
adjusting at least one of the video data and audio data to which the time information is added, the adjustment comprising at least one of improving picture quality of the video data and improving sound quality of the audio data; and
outputting the video data to the DLL when a first period of time has elapsed from a time indicated by the time information which is added to the video data, and outputting the audio data to the DLL when the first period of time has elapsed from a time indicated by the time information which is added to the audio data, at least one of the video data and the audio data being adjusted.

7. A content adjustment method of a computer on which a browser, a moving picture reception and playback program embedded in the browser as plug-in software comprising a function of downloading content comprising video data and audio data via a network, and a DLL comprising an interface configured to exchange video data and audio data with an operating system are installed, the method comprising:

receiving video data and audio data output from the moving picture reception and playback program;

adding time information to the received video data and audio data, the addition of the time information to the video data and audio data being performed after the decoding of the video data and audio data by the moving picture reception and playback program;

adjusting at least one of the video data and audio data to which the time information is added, the adjustment comprising at least one of improving picture quality of the video data and improving the sounds quality of the audio data; and outputting the video data to the DLL when a first period of time has elapsed from a time indicated by the time information which is added to the video data, and outputting the audio data to the DLL when first period of time has elapsed from a time indicated by the time information which is added to the audio data, at least one of the video data and the audio data being adjusted.

\* \* \* \* \*